(12) United States Patent
Boss et al.

(10) Patent No.: US 9,866,916 B1
(45) Date of Patent: Jan. 9, 2018

(54) AUDIO CONTENT DELIVERY FROM MULTI-DISPLAY DEVICE ECOSYSTEM

(71) Applicant: INTERNATIONAL BUSINESS MACHINES CORPORATION, Armonk, NY (US)

(72) Inventors: Gregory J. Boss, Saginaw, MI (US); Brent Hodges, Raleigh, NC (US); John E. Moore, Jr., Brownsburg, IN (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/239,053

(22) Filed: Aug. 17, 2016

(51) Int. Cl.
| | |
|---|---|
| G06F 3/00 | (2006.01) |
| G06F 13/00 | (2006.01) |
| H04N 5/445 | (2011.01) |
| H04N 21/485 | (2011.01) |
| H04N 21/439 | (2011.01) |
| H04N 21/4223 | (2011.01) |
| H04N 21/41 | (2011.01) |

(52) U.S. Cl.
CPC ..... *H04N 21/4852* (2013.01); *H04N 21/4122* (2013.01); *H04N 21/4223* (2013.01); *H04N 21/439* (2013.01)

(58) Field of Classification Search
None
See application file for complete search history.

(56) References Cited

U.S. PATENT DOCUMENTS

| | | | | |
|---|---|---|---|---|
| 6,307,941 | B1* | 10/2001 | Tanner, Jr. | H04S 1/002 381/1 |
| 6,647,119 | B1* | 11/2003 | Slezak | G06F 3/011 345/619 |
| 8,505,054 | B1* | 8/2013 | Kirley | H04N 21/4307 725/74 |
| 8,571,192 | B2 | 10/2013 | Etter | |
| 8,866,587 | B2 | 10/2014 | Chang | |
| 8,893,164 | B1* | 11/2014 | Teller | G06Q 30/0252 725/12 |
| 9,049,508 | B2 | 6/2015 | Puskarich | |
| 2006/0187305 | A1* | 8/2006 | Trivedi | G06K 9/00234 348/169 |

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — William J Kim
(74) *Attorney, Agent, or Firm* — Robert C. Bunker

(57) ABSTRACT

A method for transmitting an audio stream based on a focus of attention of a user within a multi-screen venue is presented. The method may include connecting to a mobile device associated with the user. The method may also include tracking a user face associated with the user by using at least one camera. The method may then include determining the focus of attention based on the tracked user face. The method may further include determining a video feed corresponding with the determined focus of attention. The method may also include transmitting the audio stream corresponding with the determined video feed to the mobile device.

18 Claims, 7 Drawing Sheets

(56) References Cited

U.S. PATENT DOCUMENTS

| | | | |
|---|---|---|---|
| 2009/0103738 A1* | 4/2009 | Faure | H04S 1/005 381/17 |
| 2009/0133051 A1* | 5/2009 | Hildreth | H04N 5/4403 725/28 |
| 2009/0138805 A1* | 5/2009 | Hildreth | G06K 9/00335 715/745 |
| 2010/0111377 A1* | 5/2010 | Monroe | G06K 9/00221 382/118 |
| 2011/0289506 A1* | 11/2011 | Trivi | G06F 9/526 718/104 |
| 2012/0027226 A1 | 2/2012 | Desenberg | |
| 2012/0098946 A1 | 4/2012 | Seung | |
| 2014/0078039 A1* | 3/2014 | Woods | H04N 21/4223 345/156 |
| 2015/0146078 A1 | 5/2015 | Aarrestad et al. | |
| 2015/0242980 A1 | 8/2015 | Henry et al. | |
| 2016/0249096 A1* | 8/2016 | Ortiz | H04N 21/43637 |

OTHER PUBLICATIONS

Moneytimes, "Apple's Smart Earphone Patent Detects Multiple Users, Switches Audio Profiles to Match," Money Times Tech, Jun. 3, 2015, p. 1-2, http://www.moneytimes.com/articles/2322/20150603/apples-smart-earphone-patent-detects-multiple-users-switches-audio-profiles-match.htm, Accessed on Aug. 15, 2016.

Sipb, "Managing Audio Focus," Android Developers Training, p. 1-3, MIT Student Information Processing Board, https://stuff.mit.edu/afs/sipb/project/android/docs/training/managing-audio/audio-focus.html#, Accessed on Aug. 15, 2016.

Uccello, "Respecting Audio Focus," Android Developers Blog, Aug. 28, 2013, p. 1-4, http://android-developers.blogspot.in/2013/08/respecting-audio-focus.html, Accessed on Aug. 15, 2016.

* cited by examiner

AUDIO CONTENT DELIVERY FROM MULTI-DISPLAY DEVICE ECOSYSTEM

BACKGROUND

The present invention relates generally to the field of computing, and more particularly to audio streaming.

Many venues, such as restaurants, have multiple televisions displayed for patrons. The displays show content such as sports, news, pay-per-view events, and so forth. When there are multiple video feeds, the venue must decide if all displays should be muted or if one display should have audio while the rest are muted. If the venue decides to have the audio from one video feed audible within the venue, then the venue must choose one at the exclusion of other audio feeds that certain patrons may wish to listen to.

SUMMARY

According to one exemplary embodiment, a method for transmitting an audio stream based on a focus of attention of a user within a multi-screen venue is provided. The method may include connecting to a mobile device associated with the user. The method may also include tracking a user face associated with the user by using at least one camera. The method may then include determining the focus of attention based on the tracked user face. The method may further include determining a video feed corresponding with the determined focus of attention. The method may also include transmitting the audio stream corresponding with the determined video feed to the mobile device.

According to another exemplary embodiment, a computer system for transmitting an audio stream based on a focus of attention of a user within a multi-screen venue is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include connecting to a mobile device associated with the user. The method may also include tracking a user face associated with the user by using at least one camera. The method may then include determining the focus of attention based on the tracked user face. The method may further include determining a video feed corresponding with the determined focus of attention. The method may also include transmitting the audio stream corresponding with the determined video feed to the mobile device.

According to yet another exemplary embodiment, a computer program product for transmitting an audio stream based on a focus of attention of a user within a multi-screen venue is provided. The computer program product may include one or more computer-readable storage devices and program instructions stored on at least one of the one or more tangible storage devices, the program instructions executable by a processor. The computer program product may include program instructions to connect to a mobile device associated with the user. The computer program product may also include program instructions to track a user face associated with the user by using at least one camera. The computer program product may then include program instructions to determine the focus of attention based on the tracked user face. The computer program product may further include program instructions to determine a video feed corresponding with the determined focus of attention. The computer program product may also include program instructions to transmit the audio stream corresponding with the determined video feed to the mobile device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
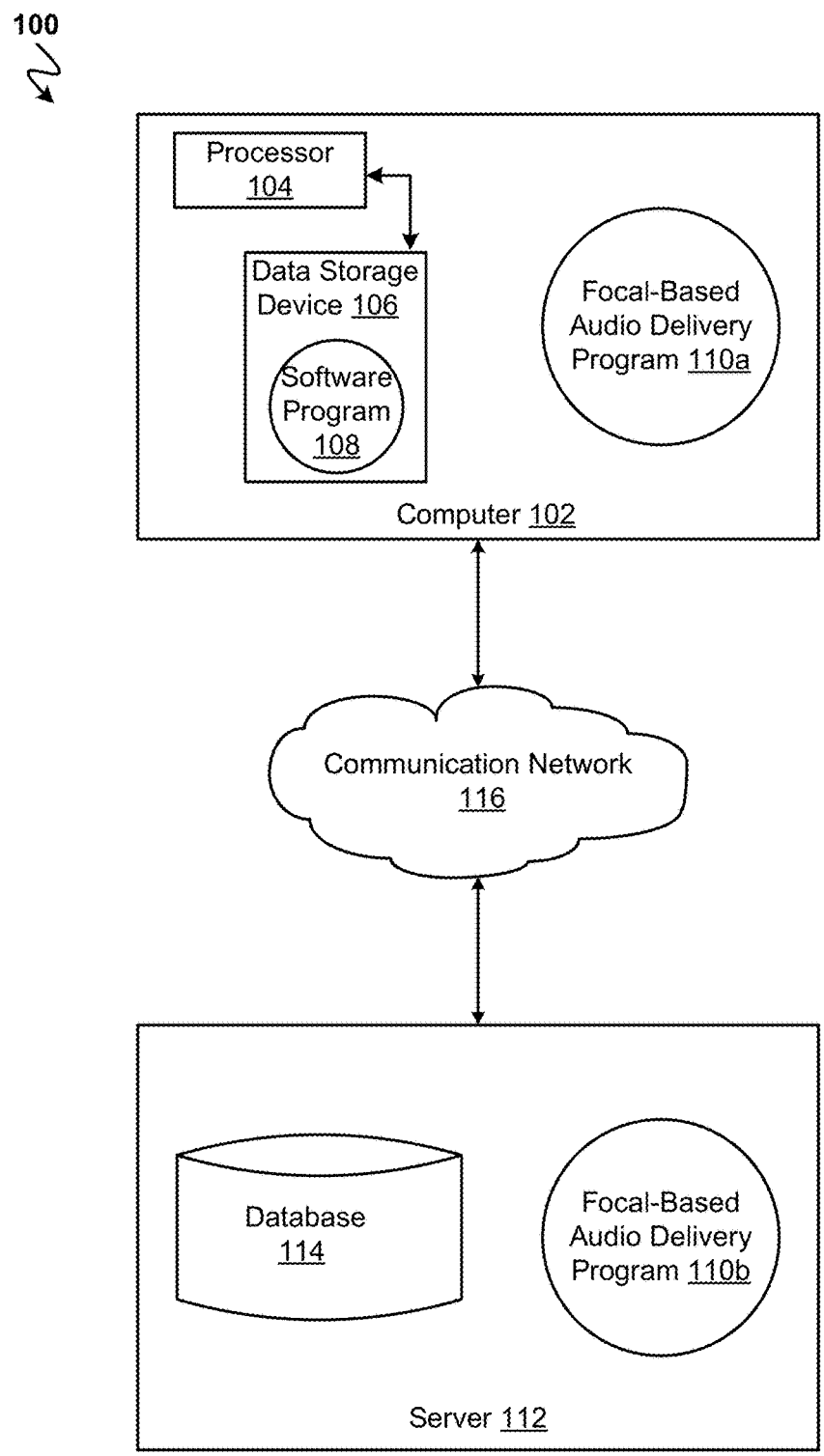
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for focus-based audio streaming. As such, the present embodiment has the capacity to improve the technical field of audio streaming by detecting which display a user is directing their attention out of multiple displays and streaming the audio corresponding to the display the user is looking at to a mobile device associated with the user. More specifically, a user profile may be initialized that includes user preferences and at least one image of the user's face. Thereafter, the user profile may be sent to a cloud system for storage and distribution to venues and businesses the user may enter. Then, when a user enters a venue, the venue's local system may detect the user and then use one or more cameras within the venue to track the user's gaze based on the image of the user's face. If the user's gaze, or focus of attention, is directed to a screen within the venue, the audio corresponding to the screen may be streamed to the user's mobile device for listening. Furthermore, the user's focus of attention may be monitored for changes and subsequently changing audio streams corresponding to a new focus of attention.

As described previously, many venues, such as restaurants, have multiple televisions displayed for patrons. The displays show content such as sports, news, pay-per-view events, and so forth. When there are multiple video feeds, the venue must decide if all displays should be muted or if one display should have audio while the rest are muted. If the venue decides to have the audio from one video feed audible within the venue, then the venue must choose one at the exclusion of other audio feeds that certain patrons may wish to listen to.

Therefore, it may be advantageous to, among other things, provide a way to detect a patron's focus of attention between multiple video feeds and provide the audio stream to the patron corresponding with the video feed that is the patron's focus of attention.

According to at least one embodiment, the audio portion of a video feed may be sent to the mobile device of a user or patron that is watching a television monitor displaying the video feed. A local ecosystem including television monitors, cameras, one or more network connections (e.g., wi-fi), and a venue computer, may analyze and determine which monitor a user is looking at and in turn send the audio stream corresponding to the monitor to the user's personal headphones or speaker system. In the event that there may be ambiguity concerning which monitor the user is focusing on, the user may be prompted to specify the desired audio stream.

The present embodiment may include detecting when a user has entered a venue after previously creating a user profile that may be accessible by the venue's local processing system. Thereafter, the venue's multi-sourced audio system may establish a connection with the user's mobile device. Cameras strategically placed within the venue may begin to then track the user's focal attention or eye gaze. As any camera detects the user's focal attention on a particular television screen, that information may be sent to the venue's processing system. The local processing system my then begin to transmit the corresponding audio stream to the user's headset or personal speakers. If the user's focal attention shifts to another television monitor, the local processing system may switch to the corresponding audio steam for that user.

According to at least one other embodiment, the ecosystem may analyze the patrons within a venue to determine if a plurality or majority or patrons are watching a single monitor (or a subset of monitors throughout the venue carrying the same video stream) and stream the corresponding audio to the public speaker system within the venue. According to at least one other embodiment, users may have control over the specific audio streams they wish to hear by locking on to an audio stream regardless of subsequent focus changes through, for example, an application on the user's mobile device.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a focal-based audio delivery program 110a. The networked computer environment 100 may also include a server 112 that is enabled to run a focal-based audio delivery program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the focal-based audio delivery program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the focal-based audio delivery program 110a, 110b (respectively) to determine and transmit an audio stream to a user based on the television monitor the user is focusing on. The focal-based audio delivery method is explained in more detail below with respect to FIGS. 2-4.

Figure 2:
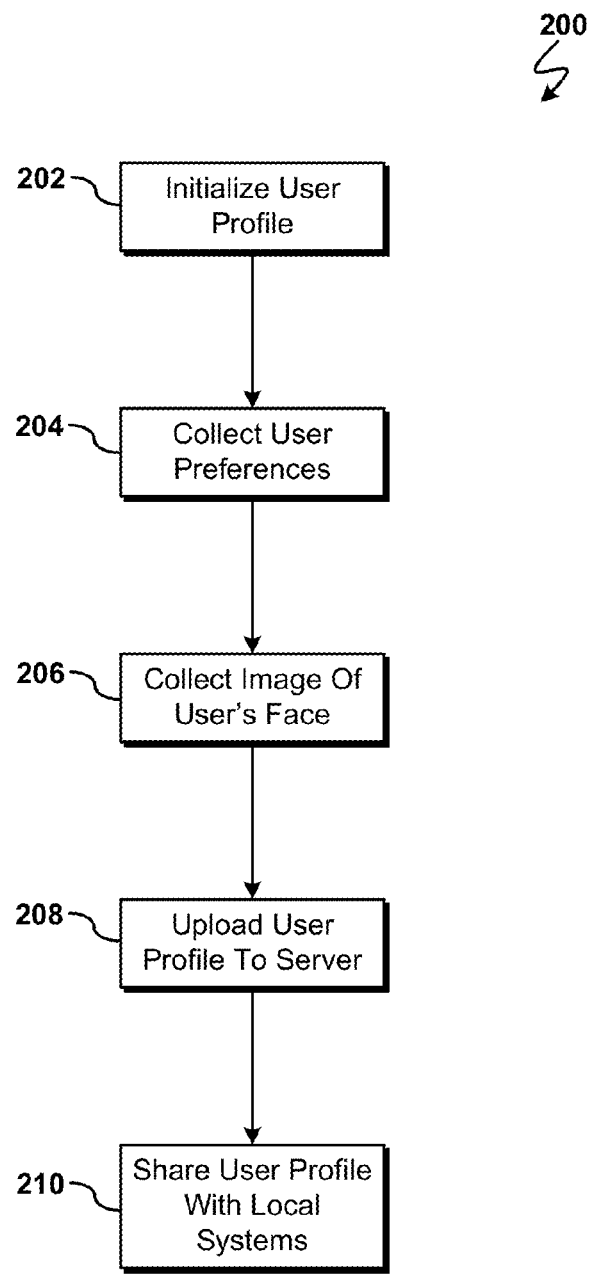
FIG. 2 is an operational flowchart illustrating a process for focus-based audio streaming user registration according to at least one embodiment.

Referring now to FIG. 2, an operational flowchart illustrating the exemplary focus-based audio streaming user registration process 200 used by the focal-based audio delivery program 110a and 110b according to at least one embodiment is depicted.

At 202 a user profile is initialized. Using a software program 108 on the user's device (e.g., client computer 102), a user profile corresponding with the user of the device may be initialized. The initialized profile may be a data file for storing one or more images, user preferences, and other relevant data. The user profile may be implemented as a data structure with fields containing user data or pointers to user data. For example, a user may interact with a smartphone (i.e., client computer 102) and start the focal-based audio delivery program 110a, 110b. The focal-based audio delivery program 110a, 110b may automatically present the user with the option to create a new profile if none is found, or may display a button or other way for the user to indicate a desire to create a new profile. Once the user affirmatively indicates a desire to create a user profile, a new data structure (e.g., an array) may be initialized for the user profile.

Next, at 204, user preferences are collected. After initializing the user profile at 202, the focal-based audio delivery program 110a, 110b may collect user preferences by presenting questions to the user that the user may reply to by, for example, entering text or selecting from a predetermined list of answers. Questions presented to the user may include viewing preferences such as a user preferring sports to news (with follow up questions to determine more specific information such as a favorite sport and a favorite team). Additionally, questions may be presented to the user that determine trigger events that may result in an audio stream being switched automatically for the user. A trigger event may include a sports team scoring or a breaking news story. The answers from the questions and any other user preferences may then be stored using the initialized user profile data structure.

Then, at 206, an image of the user's face is collected. The user may be given the option to select a preexisting image of their face or a camera attached to the client computer 102 (e.g., a front-facing camera on a smartphone) may be accessed by the focal-based audio delivery program 110a, 110b to collect an image of the user's face. Additional images of the user's face may be taken or selected to more clearly identify the user (or to better identify the user from different angles) depending on the known facial recognition technique employed by the focal-based audio delivery program 110a, 110b. Furthermore, the user may be given an option to indicate that a picture taken is satisfactory and given the opportunity to retake the picture of the user's face if the user finds the picture unsatisfactory. After the images of the user's face have been collected, the images may be added to the user profile.

At 208 the user profile is uploaded to a server 112. After the user profile is complete, the user profile may be uploaded to a cloud environment for storage on a server 112 via a network 116. The user profile may be transmitted from the user's device (e.g., smartphone) by the focal-based audio delivery program 110a, 110b to a central server 112 where the restaurants or other venues may access the user profile. On the server 112, the user profiles may be stored within a data repository, such as a database 114.

Next, at 210, the user profile is shared with local computer systems at venues. The profiles stored in one or more servers 112 may be transmitted by a network 116 connection to local systems (e.g., servers 112 or computers 102) operated by venues (e.g., restaurants). The local systems may store the user profiles in a data repository, such as a database 114, local to the venue location. The user profile may be sent to venues based on information the user provided during profile initialization (e.g., the user specified certain restaurants that the user frequents) or historical location data may be collected and analyzed to determine relevant venues that the user visits. According to at least one other embodiment, the user profiles may also be transferred directly from the user's mobile device to local systems without using a server 112.

Figure 3:
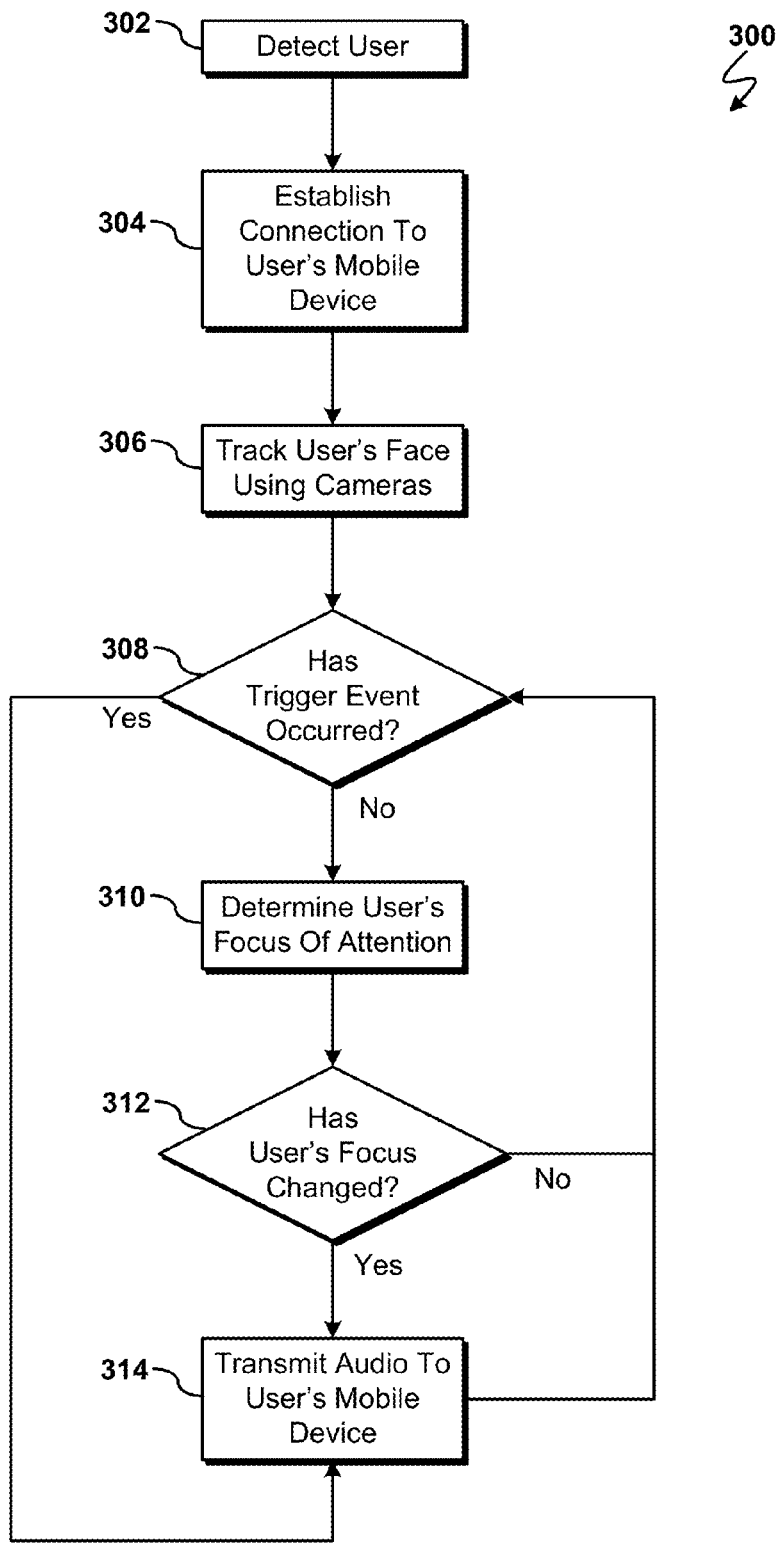
FIG. 3 is an operational flowchart illustrating a process for focus-based audio streaming according to at least one embodiment.

Referring now to FIG. 3, an operational flowchart illustrating the exemplary focus-based audio streaming process 300 used by the focal-based audio delivery program 110a and 110b according to at least one embodiment is depicted.

At 302 a user is detected at a geographic location. The user may be detected at the geographic location of a venue that has previously received the user's profile by using a mobile device that the user may be carrying. Detecting the user's mobile device at a location may be done using known methods such as querying the Global Positioning System (GPS) coordinates of the mobile device, Bluetooth® (Bluetooth and all Bluetooth-based trademarks and logos are trademarks or registered trademarks of Bluetooth SIG, Inc. and/or its affiliates) or wi-fi connectivity with the mobile device, or using near-field communication (NFC). For example, if a user who previously created a profile that was saved at restaurant Y enters restaurant Y carrying their smartphone running the focal-based audio delivery program 110a, 110b, the focal-based audio delivery program 110a, 110b may detect the user is at the geographic location of restaurant Y by comparing the user's GPS coordinates against known coordinates of restaurant Y.

Next, at 304, the local system establishes a connection to the user's mobile device. Once the focal-based audio delivery program 110a, 110b running on the user's mobile device detects the user is in particular venue (e.g., restaurant), the focal-based audio delivery program 110a, 110b may establish a connection with the venue's local system. The connection may be established using a communications network 116, such as wi-fi or Bluetooth®. Once a connection is established, the focal-based audio delivery program 110a, 110b may send an identifier corresponding with the user to the local system to indicate which user is now present at the venue. For example, when a user enters restaurant Y, the user's mobile device will establish a wi-fi connection with restaurant Y's local system via a wireless router. Additionally, the mobile device may send an identifier corresponding with the user to restaurant Y's local system and thereafter the local system may retrieve the user's user profile with images of the user's face and the user's preferences.

Then, at 306, the user's face is tracked using one or more cameras within the venue. Using known facial recognition methods, the user's face may be tracked within the venue using local cameras and one or more images of the user's face. For example, after the local system establishes a connection with the user's mobile device, video feeds from one or more video cameras distributed within the venue may be analyzed using known facial recognition methods and the image of the user's face from the user's profile to identify the user within the venue and determine which camera(s) to use to track the user's focus of attention. If the venue has ten cameras (cameras $C_1$-$C_{10}$), the feeds from the cameras may be analyzed and it may be determined that the user is within view of cameras $C_2$ and $C_3$. Thus, cameras $C_2$ and $C_3$ may be used to track the user's focus of attention or gaze.

At 308, the focal-based audio delivery program 110a, 110b determines if a trigger event has occurred. The trigger event may be a user-defined event that was collected from the user previously at 204. The trigger event may include a sports team scoring or a breaking news event. Determining when a trigger event has occurred may include analyzing news feeds on the internet, analyzing closed captioning data, or other real-time data and comparing analyzed real-time data to the user-defined trigger events. Once real-time data corresponding to a trigger event is identified, the focal-based audio delivery program 110a, 110b may determine that a trigger event has occurred.

For example, the user may have indicated that a trigger event for the user includes when sports team X scores a touchdown. Thereafter, if the user is in the venue and focused on screen $S_1$ while screen $S_8$ is displaying the game that team X is playing in and team X scores a touchdown, the focal-based audio delivery program 110a, 110b may read real-time data that indicates that team X scored a touchdown. By comparing the real-time data indicating that team X scored a touchdown with the user's trigger event corresponding to team X scoring a touchdown, the focal-based audio delivery program 110a, 110b will determine that a trigger event has occurred.

If no trigger event has occurred at 308, then the focal-based audio delivery program 110a, 110b determines the user's focus of attention at 310. The user's focal attention may be determined by using known positions of the cameras within a venue relative to the known position of individual television screens (or monitors or other displays). For example, each screen ($S_1$-$S_{10}$) may have a camera ($C_1$-$C_{10}$) positioned above the screen along the vertical centerline of the screen and a user that is determined to be facing straight at camera $C_3$ may be determined to have screen $S_3$ below camera $C_3$ as the user's focus of attention. More sophisticated techniques may be used, such as identifying the user's eyes within the user's face and determining where the user is looking, or the user's gaze, based on the user's eye position. Additionally, the local system may record the user's focus of attention, such as screen $S_3$, and a timestamp, such as 3:11:30 P.M., in a database 114.

Then, at 312 the focal-based audio delivery program 110a, 110b determines if the user's focus of attention has changed. The user's previous focus of attention may be compared with the user's current focus attention to determine if there has been a change. For example, if the user's previous focus of attention was screen $S_3$ at time 3:11:30 P.M., as recorded in the local database 114, and now the user's focus of attention is determined to be screen $S_5$ at 3:11:50 P.M., the focal-based audio delivery program 110a, 110b may determine that the user's focus of attention has changed. If the focal-based audio delivery program 110a, 110b determined that the user's focus has not changed, then the focal-based audio delivery program 110a, 110b will return to 308 to determine if a trigger event has occurred.

According to at least one other embodiment, other factors may be considered when determining if the user's focus of attention has changed. For instance, a time threshold may be set based on user preference entered through the focal-based audio delivery program 110a, 110b or by analyzing historical data collected about the user indicating how often the user changes focus that indicates how much time may be allowed to pass before a change in focus is acted upon. If the time threshold is set for 30 seconds, the user's focus shifting from screen $S_3$ at 3:11:30 P.M. to screen $S_5$ at 3:11:50 P.M. will not be determined as a change of focus since 30 seconds have not elapsed. If the user's focus is determined to still be on screen $S_5$ again in 10 seconds, the time threshold will be met and the user's focus of attention will be determined to have changed. Additionally, a user's focus may not be determined to have changed if the user's focus of attention has shifted from a venue screen to something other than a different venue screen, such as looking at another patron, looking at a menu, or looking at the user's mobile device.

According to yet another embodiment, the user may indicate that the audio stream is to be locked (i.e., not changed) regardless of the user's focus attention. The user may be provided with a software-implemented button or other interactive feature by an application (e.g., focal-based audio delivery program 110a) to indicate that the audio stream should not be changed based on the user's focus. Additionally, the user may also indicate that the audio stream should not change if there is a trigger event. For example, if, based on the user's determined focus of attention, the user has an audio stream of a sports event transmitted to the user's mobile device, the user may tap a software-implemented button displayed on the mobile device screen to indicate that the user wishes to have the current audio stream transmitted despite the user's focus of attention. Thus, the user may look at other television monitors throughout the venue without the audio stream changing. However, if a trigger event, such as a breaking news story occurs, the audio stream may then change if the user has not indicated that the audio stream should remain locked regardless of trigger events.

If the focal-based audio delivery program 110a, 110b determined that the user's focus has changed at 312, or if the focal-based audio delivery program 110a, 110b determined that a trigger event has occurred at 308, then the appropriate audio stream is transmitted to the user's mobile device at 314. The appropriate audio stream to transmit to the user's mobile device may include the audio stream corresponding with the user's current focus of attention (in response to determining that the user's focus changed at 312) or the audio stream corresponding with the trigger event (in response to determining that a trigger event occurred at 308). The audio stream may be transmitted over a communication network 116, such as wi-fi, to the user's mobile device. The user may then use internal speakers within the user's mobile device or headphones or speakers connected by wire or wirelessly to the user's mobile device to listen to the transmitted audio stream. Once an audio stream has commenced transmission to the user's mobile device, the focal-based audio delivery program 110a, 110b may return to 308 to determine if a trigger event has occurred.

Figure 4:
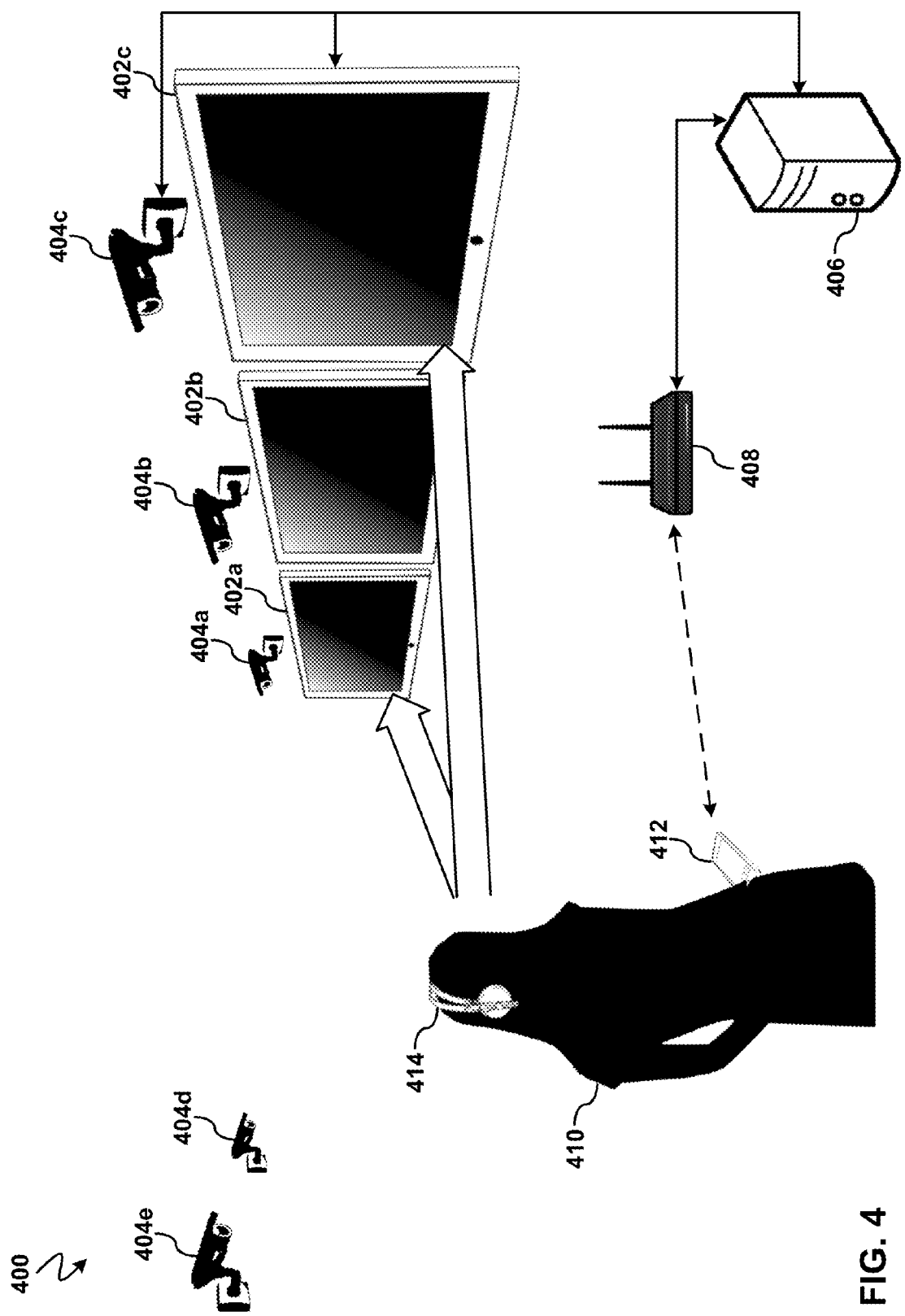
FIG. 4 is an exemplary illustration of a multi-screen venue according to at least one embodiment.

Referring now to FIG. 4, an exemplary illustration of a multi-screen venue 400 according to at least one embodiment is depicted. The multi-screen venue 400 may include multiple screens 402a-c, multiple cameras 404a-e, a local system server 406, and a wireless router 408. When a user patron 410 enters the multi-screen venue 400 (e.g., restaurant) with a mobile device 412, the patron 410 is detected at the multi-screen venue 400 by the focal-based audio delivery program 110a, 110b as described previously at 302. Thereafter, the mobile device 412 and the local system server 406 may establish a wi-fi connection using a wireless router 408 as described previously at 304. Then, the local system server 406, using the cameras 404a-e within the multi-screen venue 400, may locate and begin to track the patron's 410 face as described previously at 306. The audio stream corresponding with the screen 402a that the patron 410 is initially determined to be focused on will then be transmitted via wi-fi from the local system server 406 through the router 408 to the patron's mobile device 412 for the patron 410 to listen to using headphones 414. If no trigger event has been detected (as described at 308), then the focal-based audio delivery program 110a, 110b running on the local system server 406 may use the cameras 404a-e to determine the patron's 410 current focus of attention as described previously at 310. If the patron 410 initially was focused on screen 402a and is later determined to be focusing on screen 402c (as previously described at 312), the audio stream transmitted to the mobile device 412 will change from the audio stream corresponding with screen 402a to the audio stream corresponding with screen 402c, as described previously at 314.

It may be appreciated that FIGS. 2-4 provide only an illustration of one embodiment and do not imply any limitations with regard to how different embodiments may be implemented. Many modifications to the depicted embodiment(s) may be made based on design and implementation requirements. One other embodiment may include the focal-based audio delivery program 110a, 110b having the option to display closed captioning data corresponding to the monitor the user is focusing on using a heads up display, such as augmented reality glasses or goggles. During user preference collection at 204, the user may indicate that instead of, or in addition to, transmitting an audio stream to the user's mobile device, the closed captioning data may be transmitted to a personal heads up display. Responding to a user's change in focus or trigger events may proceed as described above regarding audio streams instead with closed caption data streams.

According to another embodiment, a single audio source may be determined for the public speaker system within a multi-screen venue 400 by tracking the focus of attention of the venue patrons 410. Using known facial recognition methods, the cameras 404*a-e* within a multi-screen venue 400 may track the focus of attention of the venue patrons 410 and select the audio stream for the speakers within the multi-screen venue 400 based on determining that a plurality or majority of patrons 410 are focused on one video stream (i.e., one television screen 402*a-c* or a subset of screens 402*a-c* with the same video stream). If a plurality of patrons (or some other threshold number) change focus to a different video stream, the corresponding audio stream played by the public speakers within a multi-screen venue 400 may change to match the new group focus of attention.

According to yet another embodiment, in response to a trigger event, an audio cue may be generated for the user to indicate which screen 402*a-c* is displaying the video feed associated with the trigger event. For instance, an audio cue may state "touchdown occurred on TV number 7" in a multi-screen venue 400 with television screens 402*a-c* marked with numbers. According to another implementation, the audio cue may use positional audio to aid in directing the venue patron 410 to the screen 402*a-c* displaying the video feed corresponding with the trigger event. Positional audio may bias the sound of the cue in an audio channel corresponding with the direction of the correct screen 402*a-c*. For example, if the patron 410 is focused on screen 402*a* and video corresponding with a trigger event is displayed on screen 402*c* to the right of the patron 410, the audio cue may only be played in the right channel of the patron's 410 headphones 414, thereby drawing the patron 410 to look to the right to see the correct screen 402*c* for the video feed of the trigger event. According to yet another implementation, a multi-screen venue 400 may use a flashing light attached to a screen 402*a-c*, display visual cues on a heads up display, or may display a flashing border onscreen to direct the patron 410 to the correct screen 402*a-c* to view the trigger event video stream.

Figure 5:
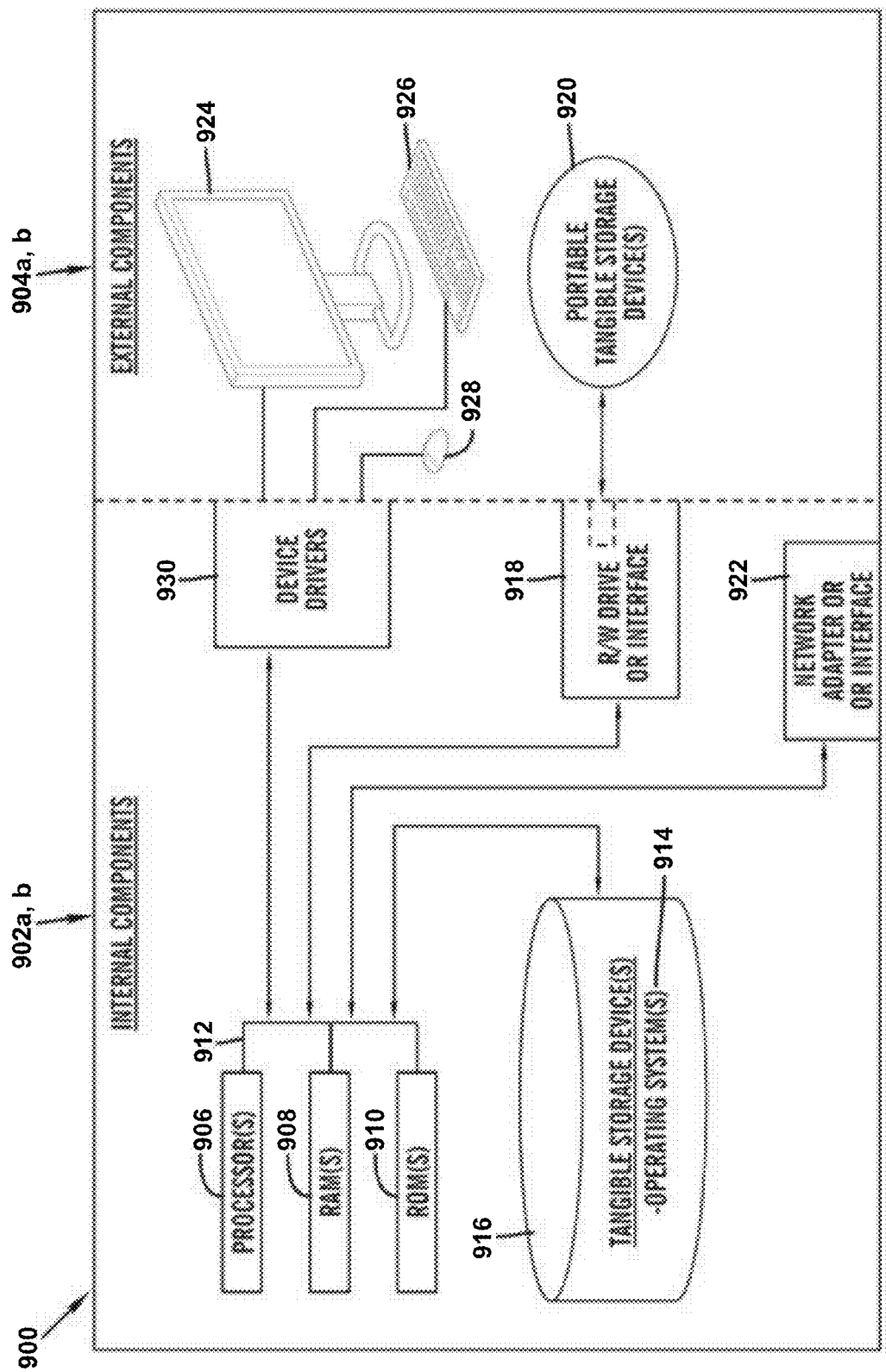
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 5. Each of the sets of internal components 902 *a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108, and the focal-based audio delivery program 110*a* in client computer 102, and the focal-based audio delivery program 110*b* in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the focal-based audio delivery program 110*a* and 110*b* can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the focal-based audio delivery program 110*a* in client computer 102 and the focal-based audio delivery program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the focal-based audio delivery program 110*a* in client computer 102 and the focal-based audio delivery program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
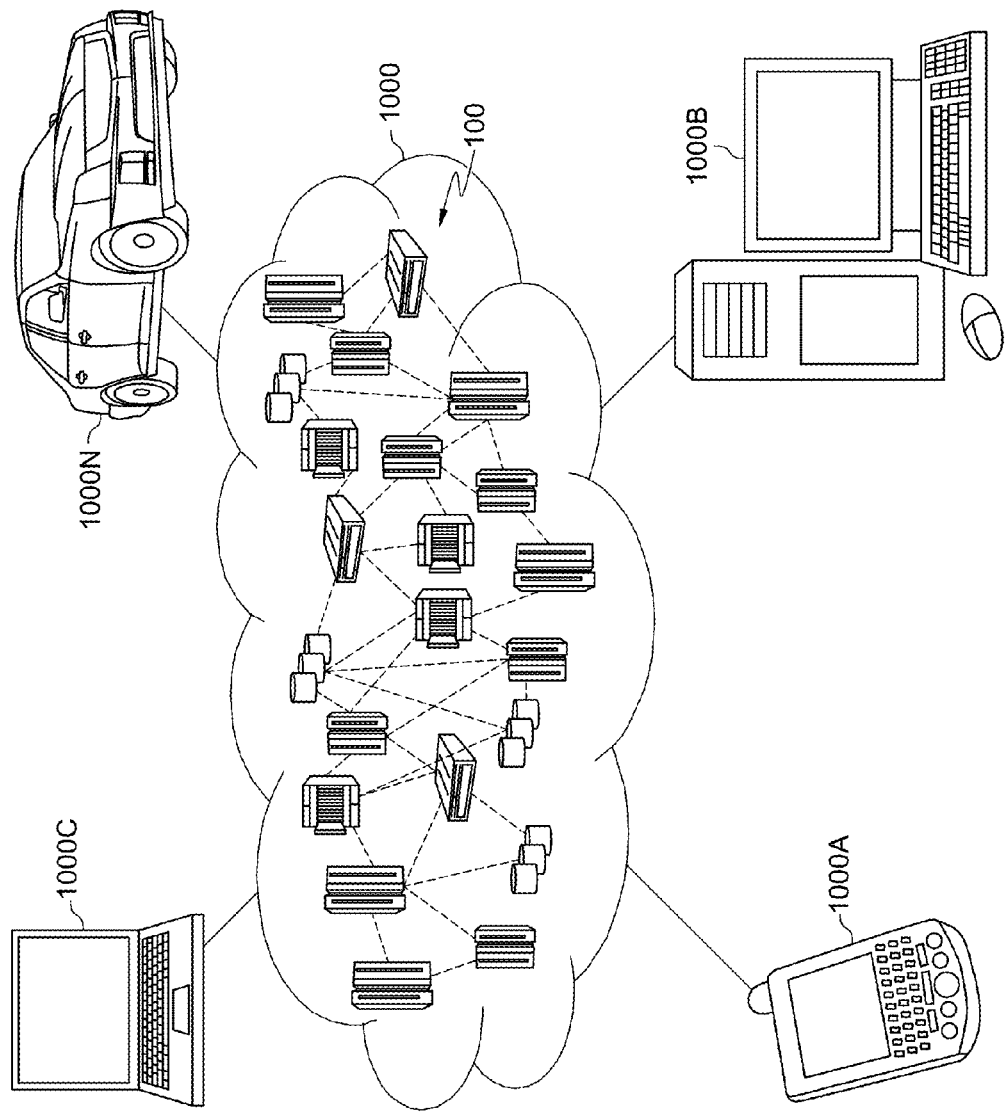
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
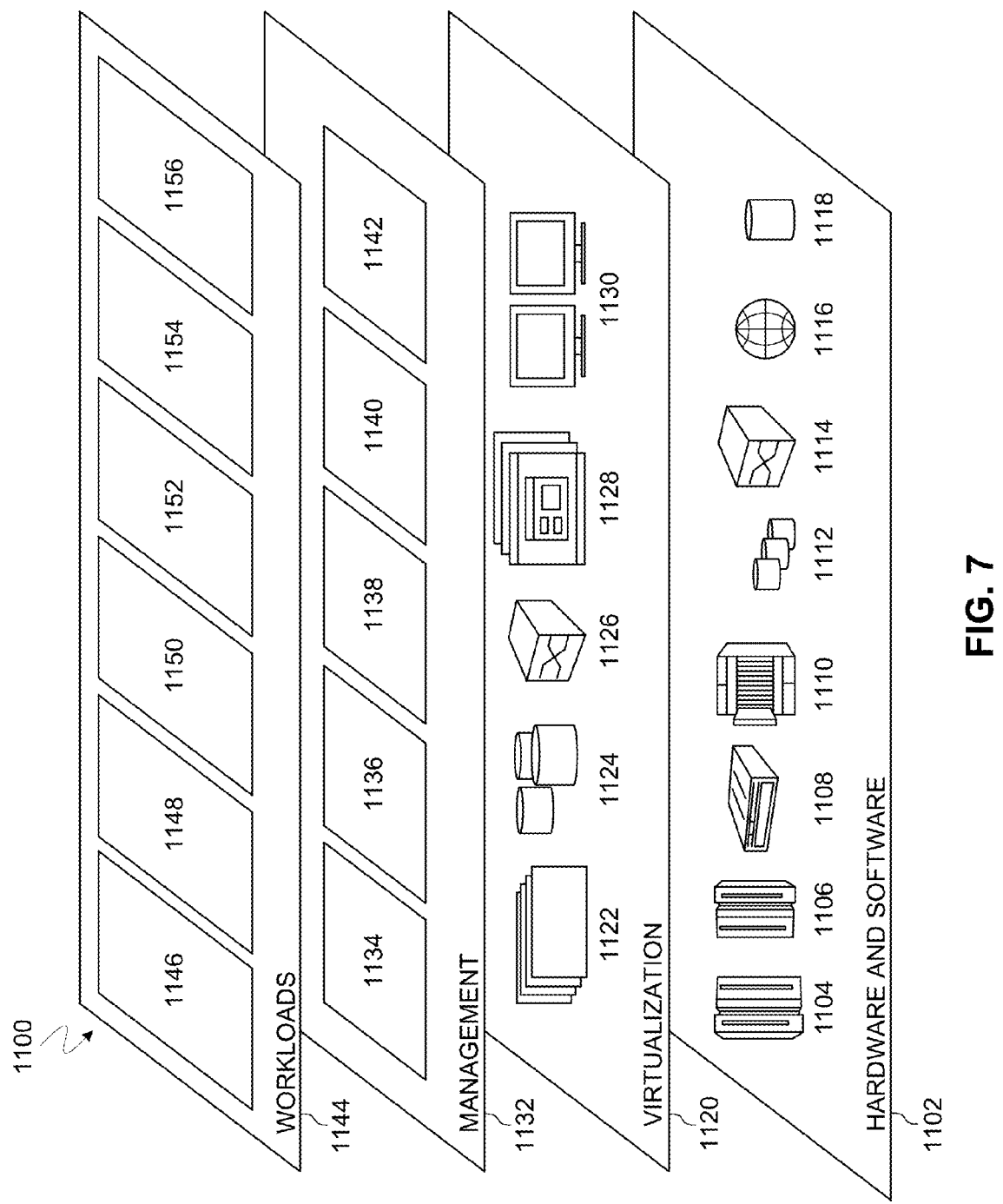
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and focal-based audio delivery 1156. A focal-based audio delivery program 110a, 110b provides a way to determine and deliver audio streams to a mobile device based on the user's focus of attention within a venue having multiple screens displaying video.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transmitting an audio stream based on a focus of attention of a user within a multi-screen venue having a plurality of cameras, the method comprising:
   detecting the user within the multi-screen venue;
   connecting to a mobile device associated with the detected user;
   retrieving a user profile associated with the detected user, wherein the user profile includes at least one user face image;
   identifying a user face associated with the user within the multi-screen venue by using the plurality of cameras based on the at least one user face image;
   tracking the identified user face within the multi-screen venue using the plurality of cameras;
   determining the focus of attention based on the tracked user face;
   determining a video feed corresponding with the determined focus of attention; and
   transmitting the audio stream corresponding with the determined video feed to the mobile device.

2. The method of claim 1, further comprising:
   determining that the focus of attention has changed;
   determining a new video feed corresponding with the changed focus of attention; and
   transmitting the audio stream corresponding with the determined new video feed to the mobile device.

3. The method of claim 1, further comprising:
   determining that a trigger event has occurred; and
   transmitting the audio stream corresponding with the determined trigger event to the mobile device.

4. The method of claim 3, further comprising:
   generating an audio cue identifying a screen displaying a trigger event video feed; and
   transmitting the generated audio cue to the mobile device.

5. The method of claim 3, further comprising:
   collecting at least one user-defined trigger event;
   wherein determining that a trigger event has occurred is based on the collected at least one user-defined trigger event.

6. The method of claim 4, wherein generating the audio cue identifying the screen displaying the trigger event video feed is biased to an audio channel to direct the user to the screen relative to the user.

7. A computer system for transmitting an audio stream based on a focus of attention of a user within a multi-screen venue having a plurality of cameras, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   detecting the user within the multi-screen venue;
   connecting to a mobile device associated with the detected user;
   retrieving a user profile associated with the detected user, wherein the user profile includes at least one user face image;
   identifying a user face associated with the user within the multi-screen venue by using the plurality of cameras based on the at least one user face image;
   tracking the identified user face within the multi-screen venue using the plurality of cameras;
   determining the focus of attention based on the tracked user face;
   determining a video feed corresponding with the determined focus of attention; and
   transmitting the audio stream corresponding with the determined video feed to the mobile device.

8. The computer system of claim 7, further comprising:
   determining that the focus of attention has changed;
   determining a new video feed corresponding with the changed focus of attention; and
   transmitting the audio stream corresponding with the determined new video feed to the mobile device.

9. The computer system of claim 7, further comprising:
   determining that a trigger event has occurred; and
   transmitting the audio stream corresponding with the determined trigger event to the mobile device.

10. The computer system of claim 9, further comprising:
    generating an audio cue identifying a screen displaying a trigger event video feed; and
    transmitting the generated audio cue to the mobile device.

11. The computer system of claim 9, further comprising:
    collecting at least one user-defined trigger event;

wherein determining that a trigger event has occurred is based on the collected at least one user-defined trigger event.

12. The computer system of claim 10, wherein generating the audio cue identifying the screen displaying the trigger event video feed is biased to an audio channel to direct the user to the screen relative to the user.

13. A computer program product for transmitting an audio stream based on a focus of attention of a user within a multi-screen venue having a plurality of cameras, comprising:
- one or more computer-readable storage medium and program instructions stored on at least one of the one or more tangible storage medium, the program instructions executable by a processor, the program instructions comprising:
- program instructions to detect the user within the multi-screen venue;
- program instructions to connect to a mobile device associated with the detected user;
- program instructions to retrieve a user profile associated with the detected user, wherein the user profile includes at least one user face image;
- program instructions to identify a user face associated with the user within the multi-screen venue by using the plurality of cameras based on the at least one user face image;
- program instructions to track the identified user face within the multi-screen venue using the plurality of cameras;
- program instructions to determine the focus of attention based on the tracked user face;
- program instructions to determine a video feed corresponding with the determined focus of attention; and
- program instructions to transmit the audio stream corresponding with the determined video feed to the mobile device.

14. The computer program product of claim 13, further comprising:
- program instructions to determine that the focus of attention has changed;
- program instructions to determine a new video feed corresponding with the changed focus attention; and
- program instructions to transmit the audio stream corresponding with the determined new video feed to the mobile device.

15. The computer program product of claim 13, further comprising:
- program instructions to determine that a trigger event has occurred; and
- program instructions to transmit the audio stream corresponding with the determined trigger event to the mobile device.

16. The computer program product of claim 13, further comprising:
- program instructions to detect the user within the multi-screen venue.

17. The computer program product of claim 15, further comprising:
- program instructions to generate an audio cue identifying a screen displaying a trigger event video feed; and
- program instructions to transmit the generated audio cue to the mobile device.

18. The computer program product of claim 15, further comprising:
- program instructions to collect at least one user-defined trigger event;
- wherein determining that a trigger event has occurred is based on the collected at least one user-defined trigger event.

* * * * *